United States Patent [19]

Sheh et al.

[11] Patent Number: 5,754,752
[45] Date of Patent: May 19, 1998

[54] END-TO-END SESSION RECOVERY

[75] Inventors: Yi-Ren Peter Sheh, Cupertino; Roger James Schroeder, San Jose, both of Calif.

[73] Assignee: Tandem Computers Incorporated, Cupertino, Calif.

[21] Appl. No.: 625,532

[22] Filed: Mar. 28, 1996

[51] Int. Cl.$^6$ .................................................. G06F 11/00
[52] U.S. Cl. ........................... 395/182.02; 395/200.57
[58] Field of Search ....................... 395/182.02, 200.33, 395/200.57, 200.58

[56] References Cited

U.S. PATENT DOCUMENTS

| | | | |
|---|---|---|---|
| 4,975,914 | 12/1990 | Ashton et al. | 395/182.02 |
| 5,470,218 | 11/1995 | Hillman et al. | 425/144 |
| 5,568,487 | 10/1996 | Sitbon et al. | 370/466 |
| 5,652,908 | 7/1997 | Douglas et al. | 395/800 |

FOREIGN PATENT DOCUMENTS 0 723 227  7/1996  European Pat. Off. .

OTHER PUBLICATIONS

Communications of the Association for Computing Machinery, vol. 35, No. 7, 1 Jul. 1992, pp. 77–98, XP000331522, Shinha A: Client–Server Computing Time–Shared Computing, pp. 83–84.

IBM Technical Disclosure Bulletin, vol. 38, No. 1, 1 Jan. 95, pp. 235–236, XP000498750, "Local Area Network Server Replacement Procedure".

*Primary Examiner*—John E. Harrity
*Attorney, Agent, or Firm*—Graham & James LLP

[57] ABSTRACT

A session recovery mechanism that permits the recovery of a session with a minimal delay to a user and with minimal data loss. When the client/server communications protocol process, such as TCP/IP process, issues an error message to a server and a client, the server and the client switch from a server data socket and a client data socket, respectively, to a new server data socket and a new client data socket, respectively. This switchover is achieved by having the client open a listening socket during its initialization process. Using the client listening socket, the client listens for a connection from the server to switch to a new data socket, in case of, for example, error messages from the TCP/IP process.

16 Claims, 8 Drawing Sheets

INITIAL CONNECTION

| 214 ~Time | 142 ~Client | 170 ~Primary Server |
|---|---|---|
| ↓ | 254 ~C: end-to-end client replies by specifying client listening socket number (see Fig. 3) ---> <br><br> non end-to-end client replies with its type ---> | |
| | | 258 ~S: for end-to-end client, records client listening socket number and fact that client is end-to-end |
| | | 262 ~S: generates session ID and sends it to end-to-end client <--- (see Fig. 4) |
| | 266 ~C: end-to-end client records session ID | |
| | ... | |

Fig. 2(b)

510 ~ RECOVERY

| 214 ~Time | 142 ~Client | 170 ~Primary Server |
|---|---|---|
| ↓ | 514 ~BACKUP TCP/IP PROCESS <--- SENDS ERROR MESSAGE ---> | |
| | 518 ~C: receives error message | 522 ~S: receives error message |
| | 526 ~C: closes client data socket; informs user of recovery in progress; listens to client listening socket | 530 ~S: determines client associated with error; -for non end-to-end client, closes all sockets; -for end-to-end client, closes primary data socket and opens new server data socket; attempts reconnect <--- to client |
| | 538 ~C: gets I/O completion from client listening socket; informs user of recovery in progress and informs server that I/O is complete ---> | |
| | | 542 ~S: again requests terminal type <--- type (see Figs. 3 and 6) |
| | 546 ~C: converts client listening socket into client data socket; informs server of new client listening socket and that it is an end-to-end client (see Figs. 3 and 6) | |

Fig. 5(a)

END-TO-END SESSION RECOVERY

BACKGROUND OF THE INVENTION

1. Field of the Invention

The present invention relates to client/server session recovery. More particularly, but without limitation, the present invention relates to client/server session recovery from a TCP/IP process failure.

2. Description of Related Art

Typically, client/server communication involves the use of a protocol, such as TCP/IP (Transmission Control Protocol/Internet Protocol). An example of client/server communication is when the client acts as a dumb terminal for a server and a user of a client accesses an application stored in the memory with the server software.

In TCP/IP, a socket is a communication interface that permits a client and a server to communicate. To connect to a server, a client communicates with a server listening socket. Usually the server and the client exchange data via data sockets. The client has a client data socket and the server has a server data socket for each client. The client data socket and the server data socket designated for the particular client are logically connected.

Sometimes the process that is implementing the TCP/IP protocol crashes. In conventional systems, such an error causes the server to terminate the client/server session. Consequently a new session must be established. As a result, significant amounts of data generated by the application can be lost.

In some systems a backup TCP/IP process executes on a backup server. While a primary TCP/IP process executes, the primary TCP/IP process checkpoints to the backup TCP/IP process the configuration and state information of the server data socket. When the primary TCP/IP process fails or is halted by an operator, the backup TCP/IP process takes over. This process is called a switchover. During switchover, the server data socket is not available to the application until after a long wait time. RFC (Internet request for comment) No. 793 describes this wait time, the MSL (Maximum Segment Lifetime) wait time, which can range from 60 seconds to 2–4 minutes.

Sometimes the process running the TCP/IP does not crash, but sends out an error message. Typically, in this situation, the TCP/IP process prevents the server data socket from being used for a fixed amount of time, such as the MSL wait time.

It is desirable to be able to quickly recover a session, even in the event of a switchover or a problem with TCP/IP.

SUMMARY OF THE INVENTION

This invention includes a method and apparatus for a fast session recovery due to an error, such as a TCP/IP process failure. The method and system implement a scheme for recovering a session without a long wait time, such as the MSL (Maximum Segment Lifetime) wait time, necessitated by, for instance, a switchover or an error message. The method and system also eliminate a need for a user to manually reconnect to a server for a new session.

In a preferred embodiment of the invention, when a client/server communications protocol process, such as TCP/IP process, issues an error message to a server and a client, the server and the client switch from a server data socket and a client data socket, respectively, to a new server data socket and a new client data socket, respectively. This switchover is achieved by having the client open a listening socket during its initialization process. Using the client listening socket, the client listens for a connection from the server to switch to a new data socket, in case of, for example, error messages from the TCP/IP process.

From a systems standpoint, a preferred embodiment of the invention comprises a server apparatus for recovering a session between a server and a client. The server apparatus comprises a communication protocol portion for providing communication between the server and a client. The communication protocol portion includes a portion for providing a server listening socket and a portion for providing a server data socket. The communication protocol portion further comprises a portion for providing a new server data socket for communicating data to the client for switching from the server data socket to the new server data socket, when the communication protocol portion generates an error message.

From a method standpoint, a preferred embodiment of the invention comprises a method for recovering a session between a server and a client. This method is performed by a processor having a memory. The method comprises the step of determining, by a server, that the client understands end-to-end protocol. The method further comprises the step of receiving an error message, by the server, from a communication protocol process. In addition, the method comprises closing, by the server, a first data socket. The method also comprises opening, by the server, a second data socket for communicating data to the client.

BRIEF DESCRIPTION OF THE DRAWINGS

FIGS. 2(a) and 2(b) are two halves of a diagram showing messages exchanged by the system of FIG. 1 during the initial connection of a client to a primary server.

FIGS. 5(a) and 5(b) are two halves of a diagram of the steps executed by an end-to-end client and the primary server in recovering a session interrupted by a primary TCP/IP error, in accordance with the embodiment of FIG. 1.

DETAILED DESCRIPTION OF THE PREFERRED EMBODIMENTS

Figure 1:
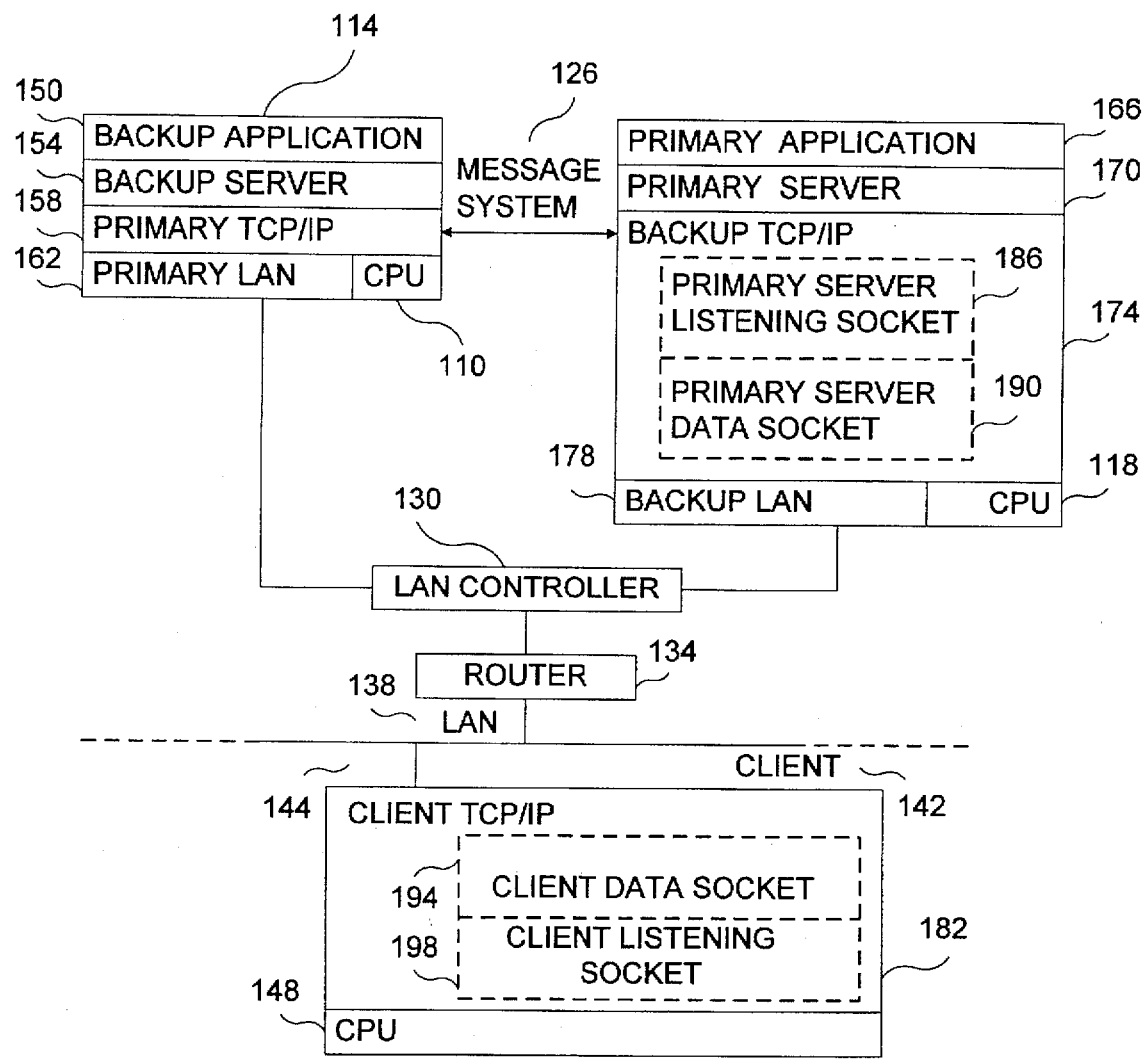
FIG. 1 shows a system for a fast session recovery due to an error, such as a TCP/IP process failure, in accordance with a preferred embodiment of the invention.

FIG. 1 shows a system for implementing a preferred embodiment of the invention. FIG. 1 shows a system for a fast session recovery due to an error, such as a TCP/IP process failure. The system of FIG. 1 implements a simple scheme for recovering a session without a long wait time, such as the MSL wait time, necessitated by, for instance, a switchover or an error message. The system of FIG. 1 also eliminates a need for a user to manually reconnect to a server for a new session.

In FIG. 1, a CPU 110 has a memory 114. A second CPU 118 also has a memory 122. CPU 110 and CPU 118 and their respective memories 114, 122 are coupled via a message system 126. While this invention is not dependent on a particular message system, the inventors have created a system using Tandem Computer Inc.'s (Tandem) Guardian message system. The Guardian message system is available from Tandem and is disclosed in "Guardian Procedure Calls Reference Manual," Tandem part number 117146, which is hereby incorporated by reference. CPU 110 and CPU 118 both are coupled to a LAN (Local Area Network) controller 130. The LAN controller 130 is coupled to a router 134 (or routers, or even to the Internet). The router 134 is connected to a LAN 138, which connects to various clients, such as client 142. The client 142 has a memory 144 and a CPU 148.

For redundancy purposes, memories 114 and 122 store primary and backup versions of different components of the system. Memory 114 stores a backup version of an application program 150. Furthermore, memory 114 stores a backup server 154 and a primary TCP/IP 158, which includes Telnet. Telnet is a simple remote terminal protocol that is typically used on the Internet. Telnet and TCP/IP are discussed in the following: SCF Reference Manual for Tandem NonStop TCP/IP, Tandem part number 108700; Tandem NonStop TCP/IP and IPX/SPX Programming Manual, Tandem part number 118066; Tandem NonStop TCP/IP Configuration and Management Manual, Tandem part number 120556; TCP/IP Management Programming Manual, Tandem part number 114690; SCF Reference Manual for Telserv, Tandem part number 111753; Telserv Guide, Tandem part number 106927; all of which are hereby incorporated by reference. Finally, a primary LAN process 162 is stored in memory 114.

Similarly, a primary application 166, a primary server 170, a backup TCP/IP process 174 and a backup LAN process 178 also are stored in memory 122. The client 142 has stored in its memory 144 a client TCP/IP process 182 for communication with the primary TCP/IP process 158 and when necessary with the backup TCP/IP process 174.

A primary server listening socket 186 is associated with the primary server 170. The primary server listening socket 186 is for primary server access by all clients connected to the primary server 170. However, each client 142 has access to a dedicated primary server data socket 190. A client 142 uses the primary server data socket 190 to communicate data to the primary server 170. A server listening socket and server data sockets also are associated with the backup server 154. For simplicity, however, they are not shown in FIG. 1.

Associated with the client 142 is a client listening socket 198. The client 142 listens on the client listening socket 198 for commands from the primary server 170 in case of, for example, a failure of the primary TCP/IP 158, as further discussed below.

The primary application 166 and the primary server 170 are stored in memory 122. However, the primary TCP/IP process 158 is stored in memory 114 so that it is executed by CPU 110 instead of CPU 118. In this fashion, should CPU 110 fail, only primary TCP/IP 158 would be lost, but not the primary server 170.

The system of FIG. 1 functions by having the client 142 emulate a terminal for controlling the execution of the primary application 166 through the primary server 170. To a user, the client 142 acts as a terminal connected to the primary server 170. An example of such a mode of operation is an NVT (Network Virtual Terminal).

Sometimes the primary TCP/IP process 158 fails. In this embodiment, the backup TCP/IP process 174 takes over for the primary TCP/IP process 158 and sends an error message to the primary server 170 and to client 142. An example of such an error message is an ECONNRESET error. The primary server receives the ECONNRESET error on the primary server listening socket 186. Ordinarily, as a result of receiving this error message, the primary server 170 would shut down the connection to client 142. Usually, when a primary server shuts down this connection, it closes the primary server data socket 190 dedicated to the particular client. Moreover, the primary server 170 would release any resources associated with this session, such as internal data structures.

However, in the system of FIG. 1, upon receiving the ECONNRESET error, the primary server 170 and the client 142 switch from the primary server data socket 190 and the client data socket 194 (which were in use at the time the ECONNRESET error was generated) to a new primary server data socket and to a new client data socket, respectively, to quickly recover the session that was being controlled by the primary TCP/IP process 158. This switchover to new data sockets is explained further below.

Figure 2A:
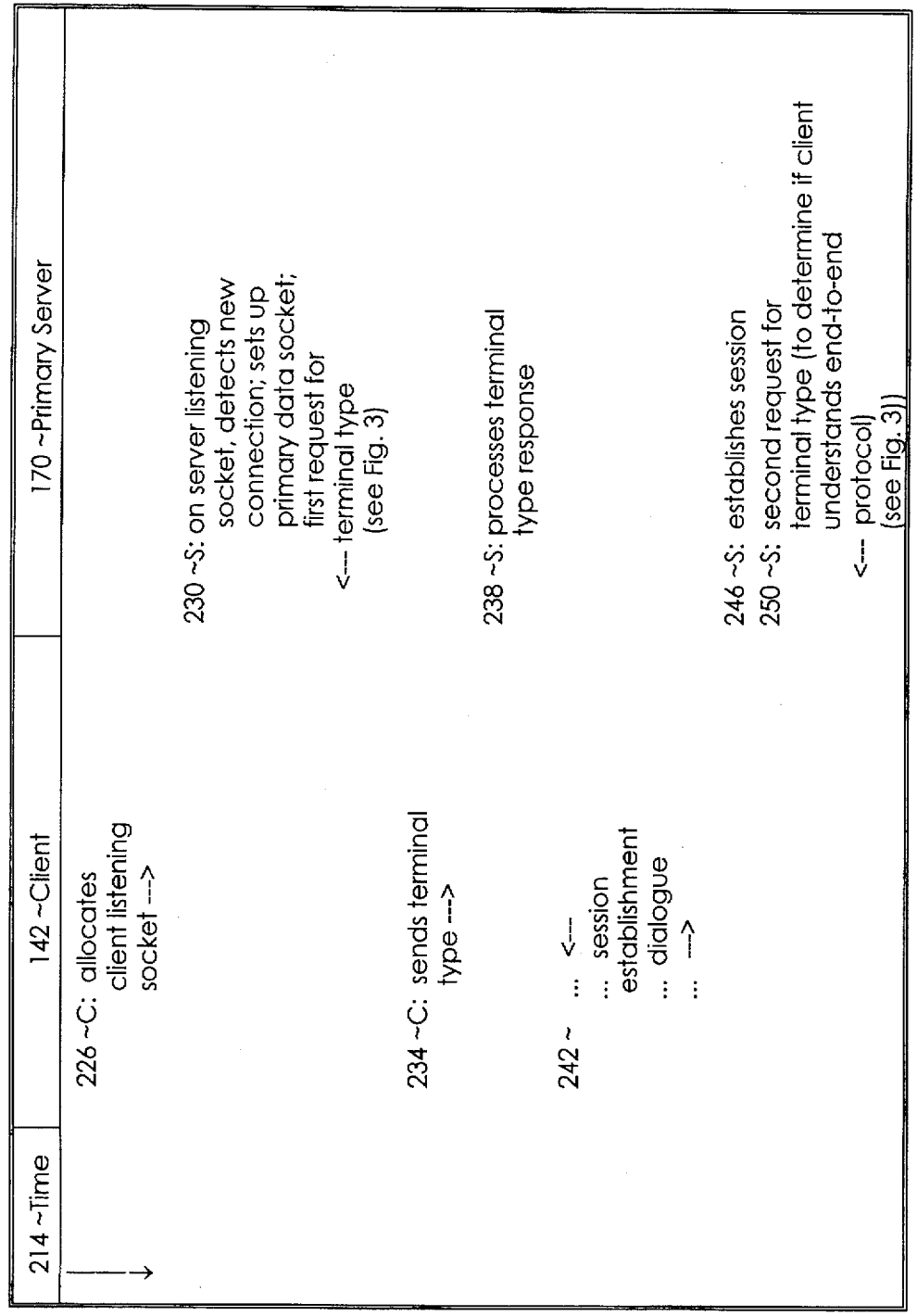

FIGS. 2(a) and (b) are a flow chart showing the steps executed by the system of FIG. 1 during the initial connection 210 of a Telnet session between the client 142 (designated as "C") and the primary server 170 (designated as "S"). In FIGS. 2(a) and 2(b), time 214 elapses from top to bottom, as steps are executed by the system of FIG. 1. When client 142 connects to the primary server 170, the client 142 preferably determines whether or not it has the capability for executing a data socket switchover. In this embodiment, the client 142, as well as the primary server 170 can implement this switch from a primary socket to an alternate socket. In step 226, the client 142 can, for example, while it is configuring, pull up its capability to switch to a new client data socket.

Having determined that it has the capability to switch, the client 142 allocates in step 226 a client listening socket 198. After allocating the client listening socket 198, the client 142 listens on this client listening socket 198 for any communication from the primary server 170. As further discussed below, upon receiving an error message from the backup TCP/IP process 174, the primary server 170 will communicate with the client 142 via the client listening socket 198.

Figure 3:
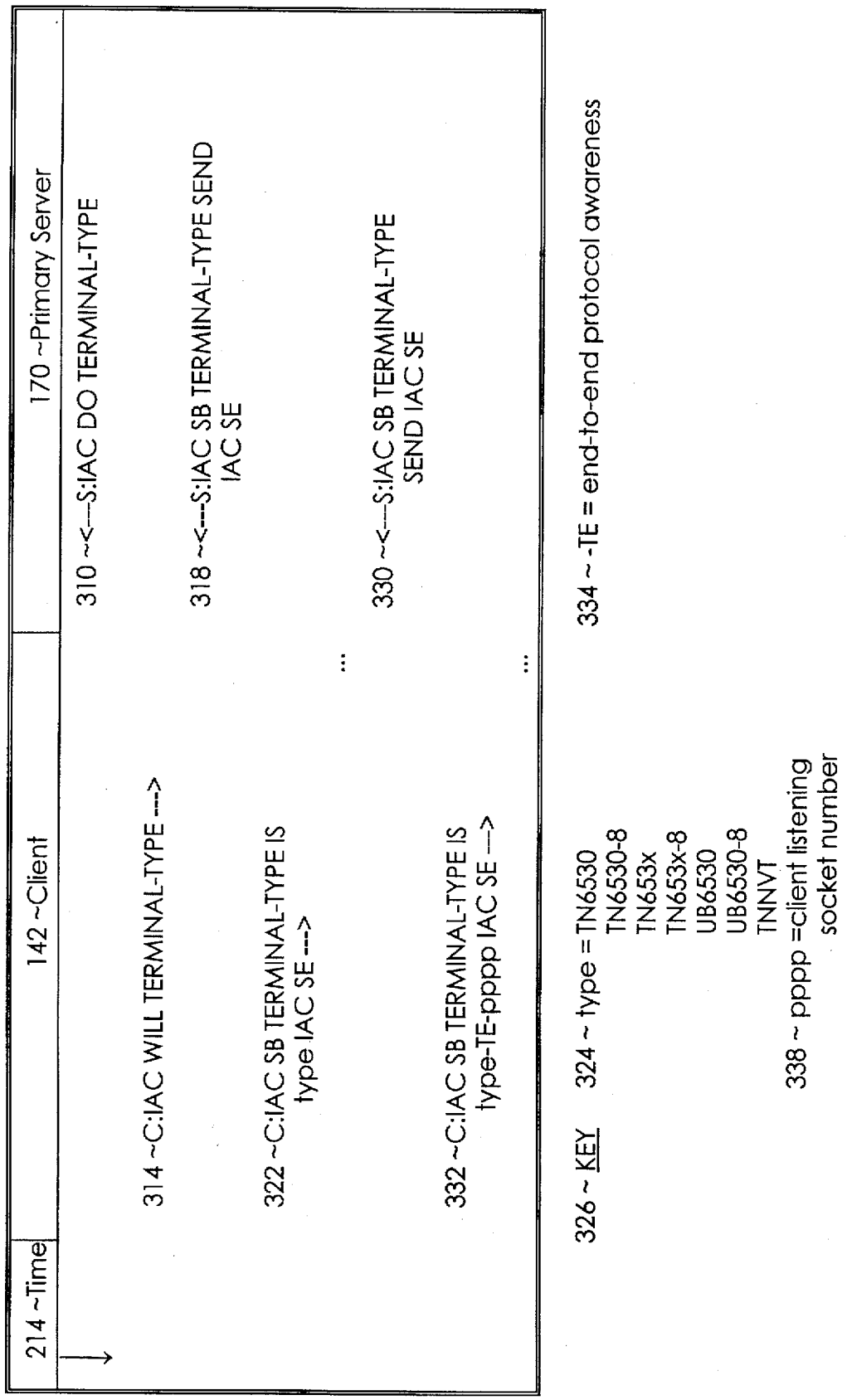
FIG. 3 illustrates the primary server's second request for the terminal type, when the client has end-to-end protocol capability, in accordance with the embodiment of FIG. 1.

In step 230, the primary server 170 detects the new connection from the client 142. The primary server 170 then sets up a primary server data socket 190 for data communication with the client 142. Next, still in step 230, the primary server 170 requests the client's 142 terminal type 324 (see steps 310–322 in FIG. 3, further discussed below). As illustrated in FIG. 3 below, there are many terminal types available.

In step 234, the client 142 sends to the primary server 170 the client's 142 terminal type 324. In step 238, the primary server 170 processes the terminal type 324 of the client 142. To communicate with the client 142, the primary server 170 sends Telnet commands, some of which are discussed below in the context of FIG. 3. In step 242, the client 142 and the primary server 170 communicate further to establish a session, as is known in the art. In step 246, the primary server 170 establishes the session.

The preceding steps initialize a session. The present embodiment performs additional initialization steps as described below. In accordance with this embodiment, in step 250, the primary server 170 requests the client's terminal type 324 a second time (see steps 330–332 of FIG. 3). (Alternatively, in another embodiment, the primary server 170 asks a second time for the client's 142 terminal type 324 immediately following step 238). The purpose of step 250 is for the primary server 170 to determine whether client 142 has been modified to include the capability to switch to a new client data socket. Because the primary server 170 at one end and the client 142 at the other end can switch to new data sockets, the present embodiment implements a protocol called an "end-to-end protocol." That ability to switch depends in part on the client 142 having a client listening socket 198, as further explained below. FIG. 3 discussed below illustrates the primary server's 170 (which has "end-to-end" protocol capability) second request for the terminal type 324 in further detail. In FIG. 2(b), in step 254, the end-to-end client 142 (i.e. a client with end-to-end protocol capability) responds to the primary server's 170 request by specifying a socket number associated with the client listening socket 198.

FIG. 3 illustrates terminal type 324 negotiations. In step 310, the primary server 170 sends a standard Telnet command to the client 142. The command of step 310 notifies the client 142 that the primary server 170 desires to negotiate the terminal type 324. In step 314, the client responds with a standard Telnet command that it is ready to supply its terminal type 324. In step 318, the primary server 170 sends the client a standard Telnet command requesting the client's 142 terminal type 324. In step 322, the client responds with its terminal type 324. Examples of possible client terminal types are listed next to "type" 324 in FIG. 3. In step 330, the primary server, which has end-to-end capability, sends the Telnet command with the second request for the terminal type 324. An end-to-end client 142 replies, in step 332, with a modified Telnet command that includes not only the terminal type 324 but also the fact that it has end-to-end protocol awareness. The end-to-end protocol awareness 334 is indicated by the letters "TE." Additionally, in the command 332, the end-to-end client 142 also specifies a client listening socket number 338, as indicated by the letters "pppp." The client listening socket number 338 identifies the client listening socket 198.

Continuing with FIG. 2(b), in step 254, a non end-to-end client replies only with its type 324. Of course the non end-to-end client does not include in its reply end-to-end protocol awareness 334 nor the client listening socket number 338. In step 258, the primary server 170 records the end-to-end client's 142 listening socket number 338. In addition, the primary server 170 records the fact that the client 142 has end-to-end protocol awareness. The primary server 170 records the alternate socket number for later use. In step 262, the primary server 170 generates a session ID. The primary server 170 generates the session ID preferably by use of a time stamp combined with secret text.

Figure 4:
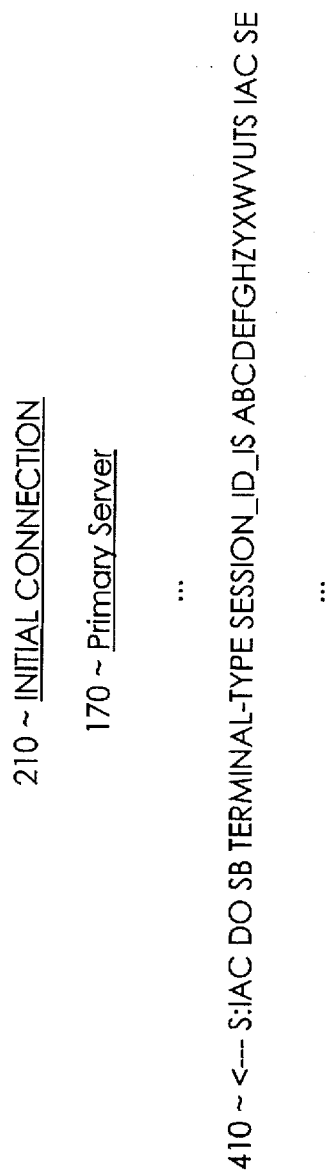
FIG. 4 shows a modified Telnet command in accordance with the embodiment of FIG. 1.

In step 262, using a modified Telnet command 410, as illustrated in FIG. 4, the primary server 170 sends the session ID to the client 142. As shown in FIG. 4, the Telnet command is modified by adding an extension "SESSION_ID_IS." In FIG. 4, the session ID itself within the modified Telnet command 410 is indicated by the letters "ABC ... UTS." The session ID "ABC ... UTS" is a 16 byte session ID, where each letter can be a different byte. In step 266, the end-to-end client 142 records the session ID for use in switching to the new client data socket, as further explained below.

Figure 5B:
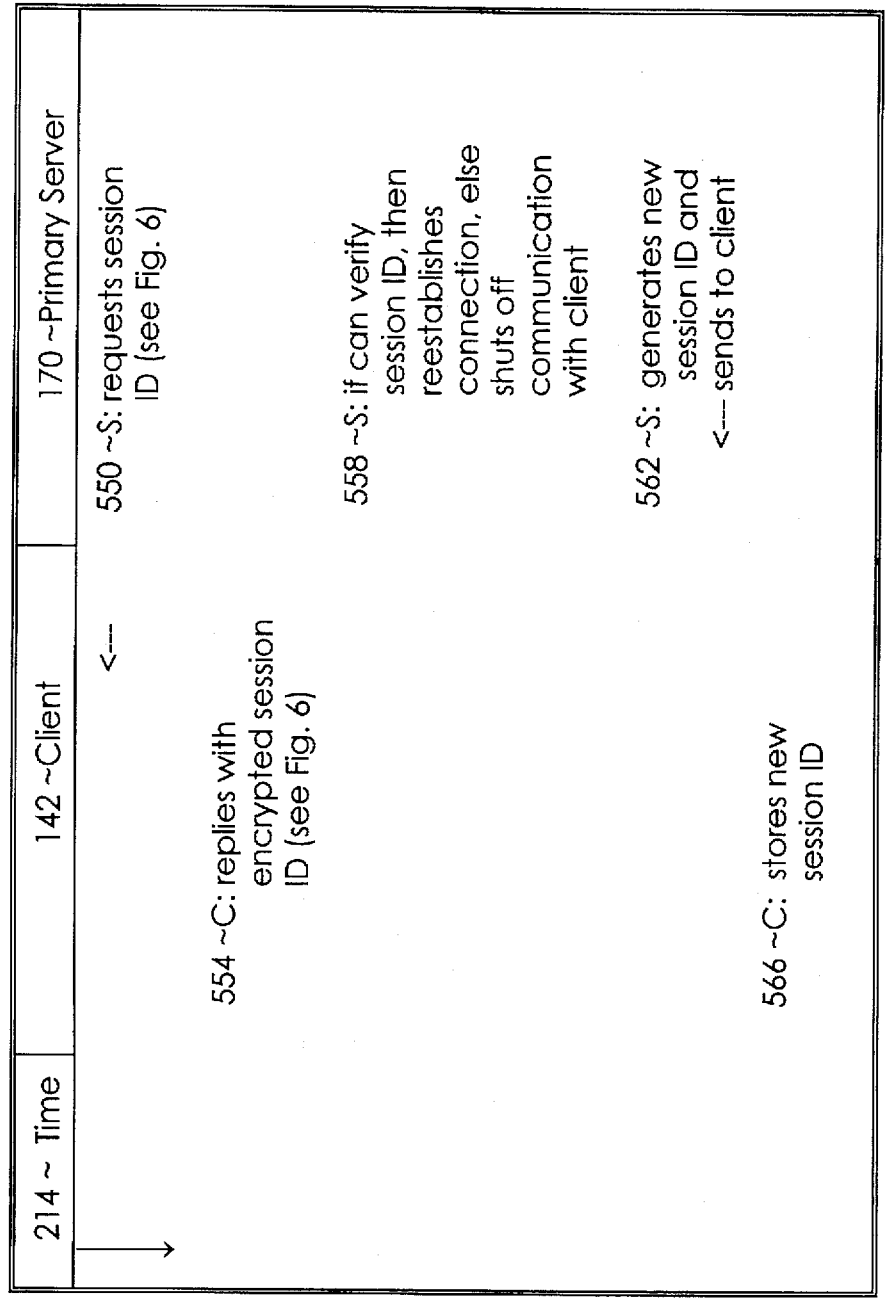

As mentioned before, the primary process TCP/IP 158 can crash. When it does, in the system of FIG. 1, the backup TCP/IP process 174 takes over for the primary TCP/IP process 158. The backup TCP/IP process 174 sends an error message, such as ECONNRESET, to the primary server 170 and to the client 142. This is shown in step 514 of FIG. 5. FIGS. 5(a) and 5(b) are flow charts of the steps executed by an end-to-end client 142 and the primary server 170 to recover a session interrupted by a primary TCP/IP error. In step 518, the client 142 receives the error message from the backup TCP/IP 174. In step 522, the primary server 170 also receives the error message from the backup TCP/IP process 174.

In step 526, the client 142 closes the client data socket 194, which was used for exchanging data between the client 142 and the primary server 170 prior to the primary TCP/IP error. In addition, in step 526 the client 142 informs the user that recovery is in progress. Furthermore, the client 142 actively listens to the client listening socket 198 for communication from the primary server 170. Eventually, if the client 142 does not receive any communication on the client listening socket 198 from the primary server 170, then the client 142 times out.

In step 530, the primary server 170 scans through, for example, a table to determine which of its clients is associated with the error sent by the backup TCP/IP 174. Primary server 170 also checks its memory to determine whether the client 142 is an end-to-end client. Also, in step 530, for a non end-to-end client, the primary server 170 terminates the connection to the non end-to-end client.

For an end-to-end client 142, the primary server 170 closes the primary server data socket 190 and acquires a new primary server data socket through, for example, the Telnet call "socket." Thereafter, the primary server 170 attempts to reconnect to the end-to-end client 142 by communicating with the end-to-end client 142 through the client listening socket 198. The primary server 170 attempts to reconnect by, for instance, use of the Telnet call "connect."

Figure 6:
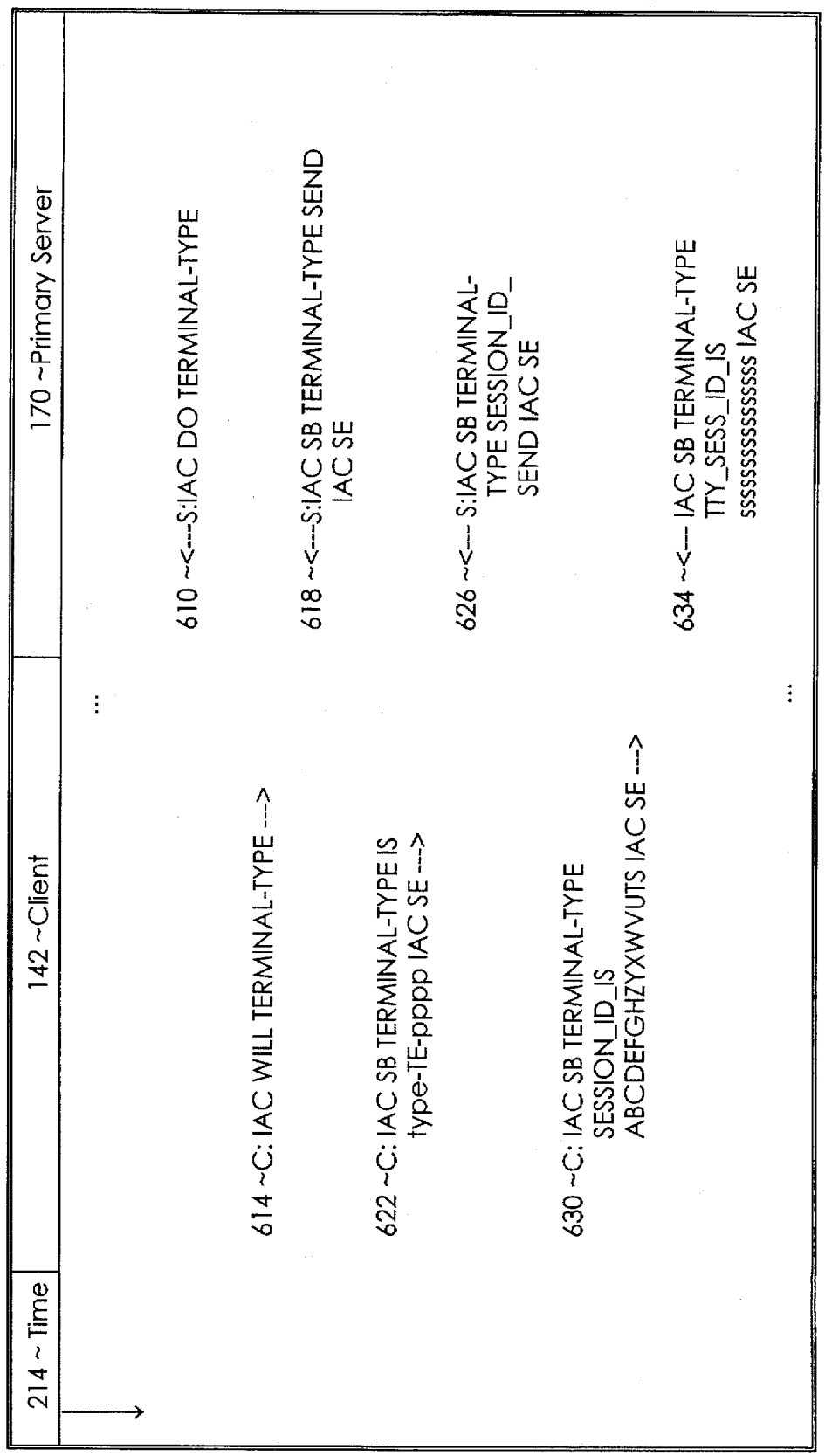
FIG. 6 shows recovery commands executed by the primary server and the end-to-end client to recover a session, in accordance with the embodiment of FIG. 1.

In step 538, the end-to-end client 142 gets the I/O completion from the primary server 170 through the client listening socket 198. While the recovery of the session is in progress, the end-to-end client 142 continues to inform its user of this fact. In addition, the end-to-end client 142 informs primary server 170 once the I/O is complete. In step 542, for end-to-end clients 142 only, the primary server 170 again (for a third time) requests the terminal type 324 of the client 142. In step 546, the end-to-end client 142 processes the request for the terminal type 324 by the primary server 170. The end-to-end client 142 converts the client listening socket 198 into a new client data socket. Then the end-to-end client 142 provides the primary server 170 with number of a new client listening socket for future reference, when, for example, the backup TCP/IP 174 that took over for the primary TCP/IP 158 fails. The client 142 also informs the primary server 170 of the fact that it has end-to-end protocol capability. This type of terminal negotiation has already been discussed above in the context of FIG. 3 and is illustrated again in steps 610–626 of FIG. 6. (In another embodiment, steps 610 and 614 are omitted. However, without steps 610 and 614, some clients may not respond to step 618 with step 622.) FIG. 6 shows recovery commands executed by the primary server 170 and the end-to-end client 142 to recover the session.

Thereafter, in step 550 of FIG. 5(b), the primary server 170 determines based on the end-to-end client's 142 response that the client 142 has end-to-end protocol capability. Checking again whether the client 142 has end-to-end capability is desirable, because the primary server 170 communicates with many different clients at different times, some of which may not have end-to-end protocol capability.

Further in step 550, the primary server 170 requests the session ID from the end-to-end client 142. Previously, in step 262 of FIG. 2(b), the primary server 170 had generated the session ID and sent it to the end-to-end client 142. The modified Telnet command for requesting the session ID is illustrated in step 626 of FIG. 6. The Telnet command is modified by adding "SESSION_ID_SEND."

In step 554 of FIG. 5(b), the end-to-end client 142 supplies the primary server with an encrypted version of the session ID that it received in step 262. A modified Telnet command for supplying this encrypted session ID is illustrated in step 630 of FIG. 6, where the Telnet command has been modified by adding "SESSION_ID_IS." The encrypted session ID "ABC ... UTS," is based on the well known MD5 scheme. The MD5 algorithm (Message-Digest Algorithm) is publicly available in RFC No. 1321, which is hereby incorporated by reference.

In step 558, the primary server 170 attempts to verify the session ID from the end-to-end client 142. If the verification is successful, then the primary server 170 completes the data socket connection to the end-to-end client 142 from its new primary server data socket to the new client data socket, which originally was the client listening socket 198. Of course, based on the above description, one of ordinary skill in the art will realize that other ways of allocating sockets are possible. For example, instead of converting the client listening socket 198 to a new client data socket, the client 142 instead could keep the same client listening socket 198 and open a new client data socket.

In step 562, the primary server 170 generates a new session ID. The primary server 170 sends this session ID to the end-to-end client 142. The primary server modified Telnet command for sending a session ID is illustrated in step 634 of FIG. 6. In that command, "sssssssssssssssss" is the new session ID. Again, this new session ID is a 16 byte ID, where each "s" may represent a different byte.

In step 566 of FIG. 5(b), the end-to-end client 142 stores this new session ID sent by the primary server 170 in step 562. This new session ID is stored for the event of another error message from the backup TCP/IP 174, which after the switchover to it has actually become the primary TCP/IP. This completes the session recovery 510.

All of this session recovery happened without the primary application 166 or the backup application 150 being involved. In other words, the session recovery of the present invention allows the primary server 170 to hide from the primary application 166 the primary TCP/IP process 158 error. While the recovery is proceeding, the primary server 170 buffers commands and data from the primary application 166. The primary server 170 continues buffering until its buffer runs out of space. At that point, the primary server 170 notifies the primary application 166 that it needs to retry its commands and/or resend data.

Several preferred embodiments of the present invention have been described. Nevertheless, it will be understood that various modifications may be made without departing from the spirit and scope of the invention. For example, sometimes the primary TCP/IP process 158 generates an ECONNRESET error, because there was a hardware failure, such as a failure of the router 134. In that event, switching data sockets does not solve the router's 134 failure. However, the backup TCP/IP process 174 attempts to communicate with the client 142 through the client listening socket 198 only for a limited period of time. After this time period elapses, the backup TCP/IP process 174 ceases its attempts to communicate with the client 142.

While, the embodiment described above has been discussed in terms of a primary server 170 and a backup server 154, in another embodiment there is no backup server 154. Instead there is only a single server 170. Indeed in this particular embodiment there are no backups for any of the items discussed above. In this embodiment there is no failure of the TCP/IP process, but instead there is an error, for example, in the TCP/IP process that causes the TCP/IP process to send out an error message, such as ECONNRESET, to the server and to the client 142. Again, as described above, an end-to-end client 142 and an end-to-end server 170 will switch to new data sockets, to reestablish a connection for data transfer across these new data sockets.

In another embodiment, the client 142, due to some malfunction, does not receive the error message, such as the ECONNRESET error. This malfunction does not pose a problem, because the end-to-end client 142 is always listening on the client listening socket 198 for any messages from the primary server 170. Upon receiving primary server session recovery commands, an end-to-end client 142 is programmed to close its client data socket 194, as described in step 526 and to continue as further described in FIG. 5.

While the embodiments above were described in terms of the ECONNRESET error, this invention can be applied to other errors, as well, to which the end-to-end primary server 170 and the end-to-end client 142 will respond as described above with respect to the ECONNRESET error. An example of such an error is a time out error. The time out error is generated by the primary TCP/IP 158, when the primary TCP/IP 158 cannot send data to the client 142. The reason for this inability to send data may be that a data buffer in the primary TCP/IP 158 is full. Another problem that can cause this time out error is a possible hardware problem, such as a malfunction with the router 134 or with the LAN 138.

Based on the above description, one of ordinary skill in the art also will realize that the 16 byte session ID can be of any other length and based on algorithms different from MD5. In addition, one of skill in the art will understand based on the above description that this embodiment described above can be used in an SPX/IPX environment instead of the TCP/IP environment. SPX stands for Sequenced Packet EXchange. SPX is a communication protocol for controlling the transport of messages across a network, similar to TCP/IP. IPX is the protocol for delivering messages. SPX/IPX is incorporated in the NetWare operating systems from Novell. Thus, the present invention is not limited to the preferred embodiments described herein, but may be altered in a variety of ways, which will be apparent to persons skilled in the art.

What is claimed is:

1. A server apparatus for recovering a session between a server and a client, the server apparatus comprising:
   a communication protocol portion for providing communication between the server and a client including
      a portion for providing a server listening socket,
      a portion for providing a server data socket; and
      a portion for providing a new server data socket for communicating data to the client for switching from the server data socket to the new server data socket, when the communication protocol portion generates an error message.

2. A method for recovering a session between a server and a client, the method performed by a processor having a memory, comprising the steps of:
   determining, by the server, that the client understands end-to-end protocol;
   receiving an error message, by the server, from a communication protocol process;
   closing, by the server, a first data socket; and
   opening, by the server, a second data socket for communicating data to the client.

3. The method of claim 2, wherein the step of determining includes the steps of:

detecting a new connection by the client;

opening the first data socket; and requesting terminal type data from the client.

4. The method of claim 3, wherein the step of determining further includes the step of requesting, by the server a second time, terminal type data from the client.

5. The method of claim 4, further comprising the step of receiving, by the server from the client, a socket number associated with a client listening socket.

6. The method of claim 2, further comprising the step of sending, by the server, a command to a client listening socket for receipt by the client.

7. The method of claim 2, further comprising the step of sending, by the server, a command to a new client listening socket for receipt by the client for recovering another session between a server and a client.

8. The method of claim 2, wherein the step of opening a second data socket for communicating data to the client includes the step of sending data to a new client data socket.

9. The method of claim 2, further comprising the step of generating, by the server, a session ID.

10. The method of claim 9, wherein the step of generating the session ID includes the step of generating the session ID by use of a time stamp combined with secret text.

11. The method of claim 9, further comprising the step of sending, by the server, the session ID to the client.

12. The method of claim 2, further comprising the step of requesting, by the server, terminal type data from the client.

13. The method of claim 12, further comprising the step of requesting, by the server, a session ID from the client.

14. The method of claim 13, further comprising the step of establishing a connection, by the server, through the second data socket and a new client data socket.

15. An apparatus for recovering a session between a server and a client, the apparatus comprising:

means for using an end-to-end protocol including:

means for determining, by the server a first time, that the client understands end-to-end protocol;

means for receiving an error message, by the server, from a communication protocol process;

means for determining, by the server a second time, that the client understands end-to-end protocol;

means for closing, by the server, a first data socket; and means for opening, by the server, a second data socket for communicating data to the client.

16. A computer program product comprising:

a computer usable medium having computer readable program code means embodied therein for causing a recovery of a session between a server computer and a client, the computer readable program code means in the computer program product comprising:

computer readable program code means configured to cause the server computer to determine that the client understands end-to-end protocol;

computer readable program code means configured to cause the server computer to receive an error message from a communication protocol process;

computer readable program code means configured to cause the server computer to effect closing a first data socket; and computer readable program code means configured to cause the server computer to effect opening a second data socket for communicating data to the client.

* * * * *